Jan. 7, 1958 E. W. YETTER 2,819,018

MAGNETIC DEVICE FOR ADDITION AND SUBTRACTION

Filed June 29, 1955 3 Sheets-Sheet 1

INVENTOR

EDWARD W. YETTER

BY Charles C. English

AGENT

MAGNETIC DEVICE FOR ADDITION AND SUBTRACTION
Filed June 29, 1955 3 Sheets-Sheet 2
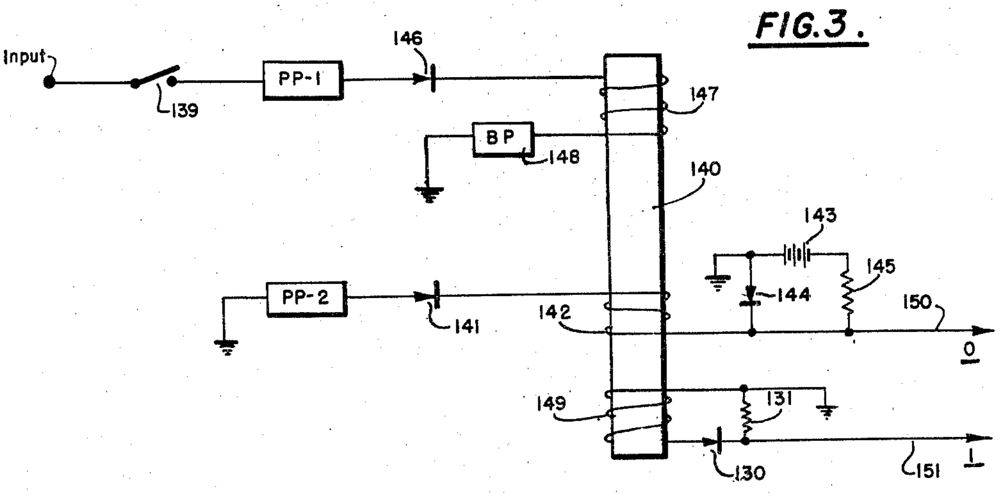
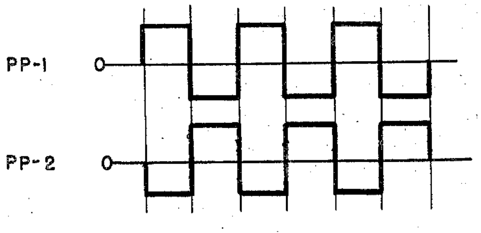
FIG. 4.
FIG. 2.
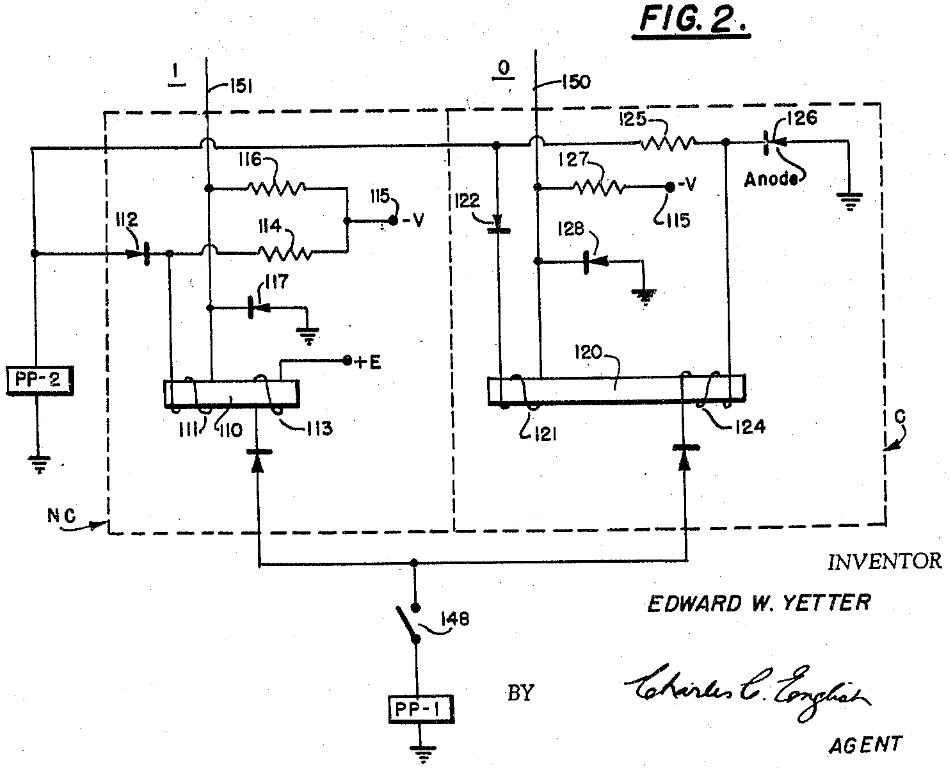
INVENTOR
EDWARD W. YETTER
BY Charles C. English
AGENT

MAGNETIC DEVICE FOR ADDITION AND SUBTRACTION

INVENTOR.
EDWARD W. YETTER
BY
Charles C. English
AGENT

United States Patent Office 2,819,018
Patented Jan. 7, 1958

2,819,018

MAGNETIC DEVICE FOR ADDITION AND SUBTRACTION

Edward W. Yetter, Chadds Ford, Pa., assignor to Sperry Rand Corporation, Philadelphia, Pa., a corporation of Delaware Application June 29, 1955, Serial No. 518,849

12 Claims. (Cl. 235—61)

This invention relates to magnetic devices for addition and/or subtraction and more particularly to such devices for the addition and/or subtraction of binary numbers.

Systems for the addition and/or subtraction of binary numbers are well known in the prior art, but as a general rule they employ vacuum tubes or other such devices. Said prior devices had the disadvantage of requiring numerous elements likely to get out of order and thereby render the device unreliable. They also were larger in size than was desirable. In addition, in some devices there was a substantial generation of heat involved.

One object of this invention is to overcome the disadvantages of these prior devices.

Another object of the invention is to provide a device which is reliable for addition and/or subtraction.

Still another object of the invention is to provide an improved device for the addition of binary numbers.

Yet another object of the invention is to provide an improved device for the subtraction of binary numbers.

A still further object of the invention is to provide a device capable of either binary addition or binary subtraction.

A further object of the invention is to provide a device for binary addition and/or subtraction which is low in cost.

Still another object of the invention is to provide a device for binary addition and/or subtraction which is small in size.

Still another object of the invention is to provide an improved input arrangement for a magnetic device capable of binary addition and/or subtraction.

Other objects of the invention will appear as this description proceeds.

The present invention employs magnetic cores which exhibit a small ratio of remanence to saturation flux density. Such cores will be referred to as cores with linear B–H curves. There is one input coil on each core. The input coils are connected with the sources of the binary signals to be added and/or subtracted. The application of binary signals to the inputs will produce a rapid rate of change of flux in certain of the cores but not in others. There are three additional units, each including coils on the cores. One section is a "sum" output section, having coils on the cores so interconnected that the sum of the binary signals fed to the inputs is indicated. Another unit having coils on the cores has connections whereby the "carry" output signals appear whenever there is a carry output. Still a third group of coils on the cores produce the "borrow" output. Preferably the input to the cores is controlled by a magnetic amplifier type of device, this being a desirable improvement feature disclosed in this application.

In the drawings:

Figure 2 is a schematic diagram of an improved input means for feeding binary signals into the device.

Figure 3 is a modified form of the device of Figure 2.

Figure 4 is a timing wave diagram for the device of Figures 2 and 3.

Figure 1:
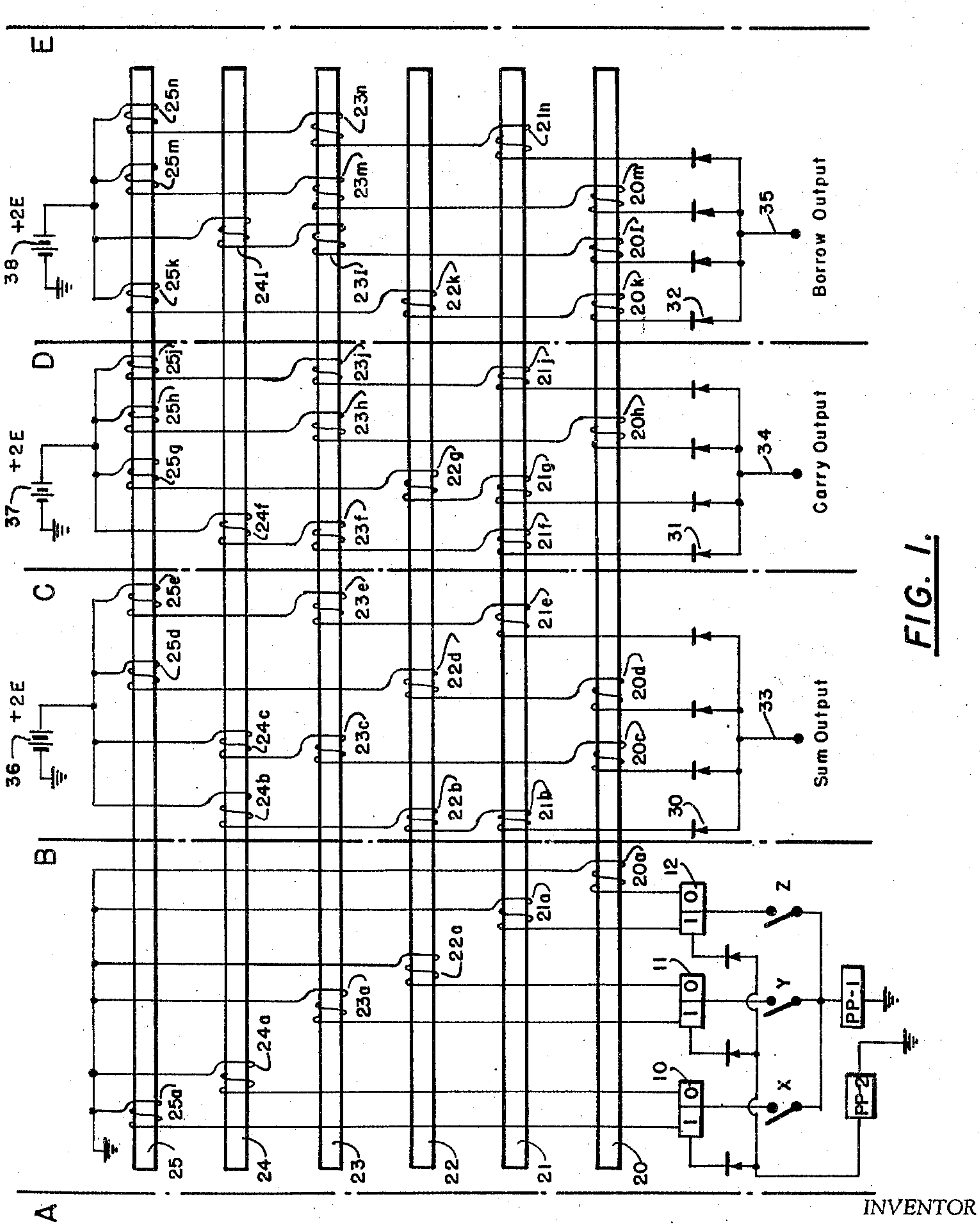
Figure 1 is a schematic diagram of the preferred form of the invention.

In Figure 1 the cores 20 to 25 inclusive have a linear B—H curve. The input section of the device (between dividing lines A and B) has one input coil on each core. These input coils carry the subscript A. The sum output section of the device (between lines B and C) has four vertical columns of coils carrying subscripts B, C, D and E. The carry output section (between lines C and D) has four vertical columns of coils bearing subscripts F, G, H and J. The borrow output section (between lines D and E) has four vertical columns bearing subscripts K, L, M and N.

If it is desired to use the device for purposes of addition only, the borrow output section D—E may be omitted. If it is desired to subtract only coils of the carry output section C—D may be omitted. When the device is used as an adder, X is the carry input while Y and Z receive the two numbers to be added. When the device is used to subtract, X is the borrow input, Y is the subtrahend input and Z is the minuend input.

Referring first to the input section (between lines A and B), it is noted that there are a plurality of input circuits 10, 11 and 12. Whenever the switch in line X is closed a binary "1" signal is fed into circuit 10. In that case a pulse appears from the "1" side of the flip-flop circuit causing a rapid change of flux in coil 25A. No current flows from the "0" side through coil 24A. On the other hand, if circuit 10 is fed with a binary "0" signal, by failing to close the switch in line X, a pulse will appear in coil 24A but not in coil 25A. The same reasoning applies to circuits 11 and 12. In other words, whenever the circuit has an input representing binary "1," a pulse appears from the "1" side of the flip-flop circuit through the complementary coil 21A, 23A or 25A, as the case may be. When the flip-flop circuit has no input, representing a binary "0" signal, there is no pulse from the "1" side but there is a pulse from the "0" side.

Referring now to the sum output section B—C, it is noted that there are three coils in each vertical column. A source of bias 36, having +2E volts, is connected at the upper end of the circuit. Each coil of the group is arranged to have a potential of —E volts induced across the same in event the core on which it is located has a rapid change of flux due to an energization of its input coil. In other words, if circuit 10 has no input, and thus produces a pulse through coil 24A, there will be potentials of —E volts induced in each of coils 24B, 24C, 24F and 24L. The potential of +2E volts on battery 36 acting on the cathodes of rectifiers, such as 30, will cut off the rectifiers and prevent flow of current therethrough except when the potential induced in the coils of any one vertical column equals —2E volts. Hence, if potentials are induced in only one or two coils of any one vertical column, there will be no current flowing through the rectifier in that column. The only condition in which current will flow through the rectifier in any one vertical column is that all three coils in the vertical column have a potential of —E volts induced therein. In such case the induced potentials will overcome the potential of battery 36 and current will flow to the sum output 33.

The arrangement of sections C—D and D—E is basically the same as in connection with section B—C. All sections have equivalent biasing batteries 36, 37 and 38, rectifiers such as 30, 31 and 32, and vertical columns of coils so arranged that no current flows in any vertical column unless a potential of —E volts is induced in each coil of the column.

In order to illustrate the operation of the device as a binary adder, it may first be assumed that the "borrow" section D—E is omitted or made inoperative. If then a binary signal "1" is fed to circuit 10 by closing the switch in circuit X, while the switches in circuits Y and Z remain open, the binary signals to be added would be 100. In this case coils 20A, 22A and 25A would be energized with pulses at the same time. (The way to insure that the pulses from all the input circuits occur simultaneously will be explained in connection with Figure 2). Hence, coils 20A, 22A and 25A will all have pulse currents flowing therethrough concurrently. This will cause rapid changes of flux in cores 20, 22 and 25. There will be no changes in flux in the cores 21, 23 and 24. The only vertical column of coils which would have potentials induced in all coils would be that column containing coils 20D, 22D and 25D. Hence, there would be a signal at the sum output 33 but none at carry output 34.

If it next be assumed that binary signal 010 is fed into the device, it is clear that coils 20A, 23A and 24A would be concurrently energized with pulses, thus creating rapid changes of flux in cores 20, 23 and 24. There would be no change in flux in the remaining cores. The only vertical column of coils wherein all three coils would have potentials induced therein would be the one including coils 20C, 23C and 24C. Hence, there would be a sum output at 33 but no carry output at 34.

If it next be assumed that the binary signal 001 is fed into the device, coils 21A, 22A and 24A would be concurrently energized with pulses, whereby there would be rapid changes of flux in cores 21, 22 and 24. There would be no changes of flux in the remaining cores. The only vertical column of coils in which potentials would be induced in all three coils would be the one containing coils 21B, 22B and 24B. Hence, there would be a sum output at 33 but no carry output at 34.

If it next be assumed that the binary signal 110 is fed to the device, coils 20A, 23A and 25A would be energized concurrently with pulses creating rapid changes of flux in the cores 20, 23 and 25. There would be no changes in flux in the remaining cores. The only vertical column of coils which would have potentials induced in all three coils would then be the one containing coils 21H, 23H and 25H. Hence, there would be a carry output at 34 but no sum output at 33.

If it next be assumed that the binary signal 101 is fed to the device, coils 21A, 22A and 25A would be concurrently energized with pulses, creating rapid flux changes in cores 21, 22 and 25, but no changes in flux in the remaining cores. The only vertical column of coils wherein all three would have potentials concurrently induced therein would be the one containing coils 21G, 22G and 25G. Hence, there would be a carry output at 34 but no sum output at 33.

If it next be assumed that binary signal 011 is fed to the machine, coils 21A, 23A and 24A would be concurrently energized, creating rapid flux changes in cores 21, 23 and 24, but in no others. The only vertical column having potentials induced in all three of its coils in this case is the one containing coils 21F, 23F and 24F. Hence, there would be a carry output at 34 but no sum output at 33.

If now it be assumed that the binary signal 111 is fed to the device, all three circuits 10, 11 and 12 would produce a pulse at their "1" sides, concurrently energizing coils 21A, 23A and 25A. Hence, cores 21, 23 and 25 would have rapid flux changes therein. The other cores would not have flux changes. This would induce potentials in all of the coils 21E, 23E and 25E, thus producing a sum output at 33. It would also induce potentials in all of the coils of the column containing coils 21J, 23J and 25J, thus producing a carry output at 34. Hence, in this case there would be both a sum output at 33 and a carry output at 34.

During the foregoing illustrative examples, it was assumed that the device was being used as an adder only and that all parts between vertical lines D and E were made inoperative or omitted. It will now be assumed that the device will be used as a subtracting device only and that all of the coils between vertical lines C and D are to be made inoperative or omitted.

To illustrate the operation of the device when it is desired to subtract, let it be assumed that the binary signals 010 are fed to the device. In this case coils 20A, 23A and 24A would be concurrently energized with pulses producing flux changes in cores 20, 23 and 24. There are two vertical columns having coils respectively on cores 20, 23 and 24. There is the vertical column containing coils 20C, 23C and 24C (which is connected to the sum output 33), and the vertical column containing coils 20L, 23L and 24L. The last-mentioned vertical column is connected to the borrow output 35. Hence, in this case, there would be a sum output at 33 and a borrow output at 35, which is correct for a subtracting device operating on the binary system.

Other subtracting operations are apparent from the foregoing illustration taken in conjunction with the detailed analysis of the addition operations hereinabove given.

Circuits 10, 11 and 12 of Figure 1 may be flip-flop circuits of the type shown in the copending application of William J. Bartik, entitled "Flip-Flop Circuit," filed April 29, 1955, Serial No. 504,974; or of the type shown in the copending application of Theodore H. Bonn, entitled: "Electrical Circuit with Two Stable States," filed March 29, 1955, Serial No. 497,549. Both of these applications disclose flip-flop circuits with set and reset inputs as well as two separate outputs. These circuits have two stable states. Energizing the set input places the device in the first stable state wherein there is a pulse at the first output but none at the second output. The device remains in this stable state until the reset output is energized, at which time a pulse appears at the second output but not at the first.

In some cases it is desirable to substitute for the flip-flop circuits of the aforesaid prior applications, a modified form of circuit which has two outputs and only one input. When the input is energized, pulses appear only at the first output; and when the input is not energized, pulses appear only on the second output. The latter form of circuit is shown in Figure 2 wherein there is a non-complementing magnetic amplifier NC and a complementing magnetic amplifier C, both fed by a common input switch 148 connected to a source of square wave alternating current power pulses PP–1. The source PP–1 has positive excursions which occur during the spaces between the positive excursions of source PP–2, as shown in Figure 4. When switch 148 is closed, the operation is as follows. During the first positive excursion of source PP–1, a negative magnetizing force on core 110 is set up in coil 113. There is also a positive magnetizing force in the core resulting from flow of current from ground, rectifier 117, power winding 111, resistor 114, to negative source 115. These two magnetizing forces cancel and consequently the core remains at positive remanence. The next positive excursion from source PP–2 flows through rectifier 112, finds low impedance in coil 111 and therefore flows therethrough to output 151.

So long as switch 148 is closed, this operation continues. There is no output at 150 since pulses from source PP–1, flowing through coil 124, reset core 120 to negative remanence. Positive pulses from source PP–1 may flow through coil 124 since at the interval that these positive pulses occur, source PP–2 has gone negative and has caused a flow of current from ground through rectifier 126, resistor 125 to source PP–2. This has lowered the cathode of rectifier 126 to ground potential. Therefore there is a potential difference across coil 124.

Since the core 120 is at negative remanence at the time the next positive excursion of source PP–2 occurs, current will flow from that source through rectifier 122, but will find coil 121 with high impedance since any current in that coil will necessarily tend to drive the core 120 from negative to positive remanence. Therefore the output current will be small and in fact will be neutralized by the sneak suppressor 115—127—128 which causes a small flow of current of substantially equal magnitude to the sneak current. Hence, when switch 148 is closed, pulses from source PP–2 will appear at output 151 but not at output 150.

If switch 148 is open, no current will flow in coil 113. Therefore during negative excursions of source PP–2 core 110 will be reset to negative remanence by flow of current from ground, rectifier 117, coil 111, resistor 114, to source 115. The next positive excursion of source PP–2 will therefore tend to drive core 110 from negative to positive remanence, whereby coil 111 will have high impedance and only a small current will flow through coil 111. This current will be neutralized by the sneak current suppressor 115—116—117, which causes a small flow of current to oppose that tending to flow through the coil 111. On the other hand, there will be output signals at 150 since the input coil 124 will not be energized and core 120 will remain at or above positive remanence. Therefore coil 121 will have low impedance and will allow the positive excursions of source PP–2 to readily flow therethrough.

Another form of input circuit is shown in Figure 3. This circuit has a core 140 (composed of material with a substantially rectangular hysteresis loop), a power winding 142, an output winding 149, and an input winding 147. Sources PP–1 and PP–2 are square wave alternating current sources which are out of phase with each other so that one goes positive when the other goes negative, all as shown in Figure 4. Blocking pulse generator 148 produces a train of positive pulses which occur in phase with (and of the same duration as) positive excursions of source PP–2. Source BP has no negative excursions.

Assume for purposes of illustration, that the core has remained at or above positive remanence for a substantial period of time, while switch 139 was open. In this situation, the operation of the device is as follows. Coil 147 is not energized. Every positive excursion of source PP–2 flows through rectifier 141, coil 142 to output 150. This drives the core from positive remanence to positive saturation. After each positive excursion of source PP–2 the core returns to positive remanence. There is a signal at output 150. There is very little rate of change of flux in the core during these operations and no signal is induced in output coil 149 and no signal appears at output 151. If it now be assumed that switch 139 is closed so that the next positive pulse of source PP–1 flows through rectifier 146, coil 147 and blocking pulse generator 148, to ground, the action will be as follows, remembering that the positive excursion of source PP–1 occurred during an interval when the potential across blocking pulse generator 148 was zero and at a time when source PP–2 was negative and was therefore cutting off rectifier 141. Positive pulses from source PP–1, flowing through coil 147, will revert that core to negative remanence which will cause a rate of change of flux in coil 149; but since rectifier 130 is connected to oppose the flow of output current in this particular instance, no current flows through resistor 131 or to output 151. However, the next positive excursion of PP–2, flowing through rectifier 141 and coil 142, will tend to drive the core back from negative remanence to positive remanence. Coil 142 will have high impedance during this action and there will be a large rate of change of flux in core 140. Therefore a large induced potential in coil 149 will cause a flow of current through rectifier 130 and resistor 131, producing a pulse at output 151. Due to the high impedance of coil 142, the current flowing therethrough will be very small and it will be cancelled by the sneak suppressor 143—144—145. The battery 143 tends to cause a flow of current through the rectifier 144 and the resistor 145 equal and opposite to the sneak current tending to flow through coil 142, when the latter has high impedance, and therefore cancels this current so that none of it appears at the output 150.

It is clear from the foregoing description, that when the input switch 139 is open, a pulse appears at output 150 but not at output 151. On the other hand, when switch 139 is closed, there will be a pulse at the output 151 but none at output 150.

It is clear from the foregoing description that in the case of every binary signal fed into the input circuits 10, 11 and 12, all three of these circuits will have output pulses timed to occur in synchronism with each other. This follows since all outputs of circuits 10, 11 and 12 can only occur during positive excursions of source PP–2.

While, for the sake of simplicity, the inputs have been shown in Figure 1 as simple switches X, Y and Z, (which bear reference numbers 139 and 148 in Figures 5 and 3), it is noted that in a more complete data translating or computing system a circuit or device of much greater complexity than a simple switch would usually be used. Those skilled in the art fully understand this as well as many ways of doing it, remembering always that it is preferable to feed the triggering pulses into the input coils of circuits 10, 11 and 12 only during spaces between positive pulses of source PP–2 whereby to control the next positive pulse of source PP–2. There are, however, many circuits that could be substituted for circuits 10, 11 and 12 that would produce the required synchronized pulses in one or more of coils 20A to 25A.

It is also noted that while there are only three binary inputs $2^0$, $2^1$ and $2^2$ (marked X, Y and Z), the same principle can be expanded without limit.

As shown in Figure 1, all three of the circuits 10, 11 and 12 are fed by the same alternating current source of pulses PP–2. Therefore, the pulses leaving the circuits 10, 11 and 12 must all occur concurrently. It follows that all of the potentials induced in the several coils of any particular vertical column will occur concurrently. In other words, each time source PP–2 goes positive, a pulse must leave each of the circuits 10, 11 and 12. The only thing that the input to the circuit does is to determine from which side of the circuit the pulse will leave.

Figure 5:
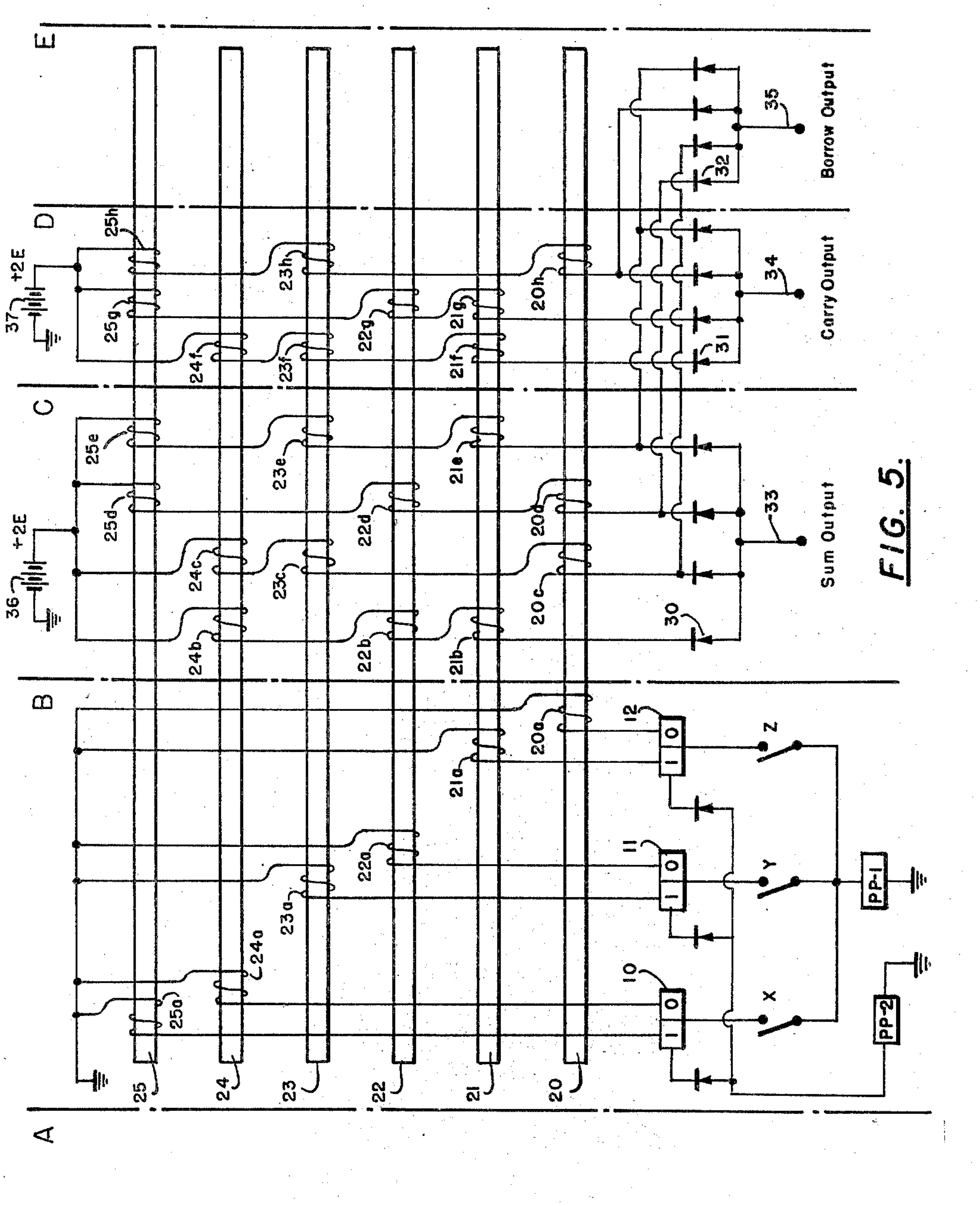
Figure 5 is a schematic diagram of a modified form of the device.

Figure 5 illustrates a simplified form of Figure 1. It is noted in Figure 1 that the vertical column of coils containing coils 20C, 23C and 24C is the same as the vertical column containing coils 20L, 23L and 24L. Hence, these two columns may be combined as shown in Figure 5.

Likewise the vertical column of Figure 1 containing coils 20D, 22D and 25D may be combined with the column containing coils 20K, 22K and 25K. Other examples showing how the vertical columns may be combined will be apparent if one makes a careful comparison of Figures 1 and 5.

I claim to have invented:

1. A device for adding and subtracting binary numbers comprising a plurality of groups of cores with two cores in each group, said cores having substantially linear B—H curves, input means for each group of cores, each input means having two outputs respectively representing binary "0" and binary "1" and including means for applying a momentary change of magnetizing force to one core of its associated group when producing the binary "0" output and for applying a momentary change of magnetizing force to the other core of its associated group when the input means is producing a binary "1" output, means connected to each input means for causing the latter to produce one or the other of its two outputs, sum output means comprising a plurality of series circuits each of which series circuits has coils located on such of said cores that at least one series circuit has potentials induced in all of its coils when a sum output signal is appropriate, said sum output means also including means for combining the outputs of its series circuits and for applying a bias to the series circuits so that it has no output unless all of the coils of one of the series circuits have potentials concurrently induced therein, carry output means including a plurality of series circuits having coils located on such of said cores that at least one series circuit has potentials induced in all of its coils when a carry output signal is appropriate, said carry output means also including means for combining the ouputs of its series circuits and for applying a bias to its series circuits so that it has no output unless all of the coils of one of the series circuits of the carry output means have potentials concurrently induced therein, and borrow output means including a plurality of series circuits having coils located on such of said cores that at least one series circuit has potentials induced in all of its coils when a borrow output signal is appropriate and which borrow output means includes biasing means that prevents current from flowing in any of said series circuits of the borrow output means unless all of the coils in any one series circuit have potentials concurrently induced therein, the outputs of the series circuits forming the borrow output means being combined to provide a borrow output.

2. A device for adding binary numbers comprising a plurality of groups of cores with two cores in each group, said cores having substantially linear B—H curves, input means for each group of cores, each input means having two outputs respectively representing binary "0" and binary "1" and including means for applying a momentary change of magnetizing force to one core of its associated group when producing the binary "0" output and for applying a momentary change of magnetizing force to the other core of the associated group when the input means is producing a binary "1" output, means connected to each input means for causing the latter to produce one or the other of its two outputs, sum output means comprising a plurality of series circuits having coils located on such cores that at least one series circuit has potentials induced in all of its coils when a sum output signal is appropriate, said sum output means also including means for combining the outputs of its series circuits and for applying a bias to the series circuits so that it has no output unless all of the coils of one of the series circuits have potentials concurrently induced therein, carry output means including a plurality of series circuits having coils of the series circuits located on such cores that at least one series circuit has potentials induced in all of its coils when a carry output signal is appropriate, said carry output means also including means for combining the outputs of its series circuits and for applying a bias to the series circuits so that it has no output unless all of the coils of one of the series circuits have potentials concurrently induced therein.

3. A device for subtracting binary numbers comprising a plurality of groups of cores with two cores in each group, said cores having substantially linear B—H curves, input means for each group of cores, each input means having two outputs respectively representing binary "0" and binary "1" and including means for applying a momentary change of magnetizing force to one core of its associated group when producing a binary "0" output and for applying a momentary change of magnetizing force to the other core of the associated group when the input means is producing a binary "1" output, means connected to each input means for causing the latter to produce one or the other of its two outputs; sum output means comprising a plurality of series circuits having coils located on such cores that at least one series circuit has potentials induced in all of its coils when a sum output signal is appropriate, said sum output means also including means for combining the outputs of its series circuits and for applying a bias to the series circuits so that it has no output unless all of the coils of one of the series circuits have potentials concurrently induced therein; borrow output means including a plurality of series circuits having coils located on such cores that all of the coils of at least one series circuit is energized when a borrow output is appropriate and which borrow output means includes biasing means that prevents current from flowing in any of said series circuits of the borrow output means unless all of the coils in any one series circuit have potentials concurrently induced therein, the outputs of the series circuits forming the borrow output means being combined to provide a borrow output.

4. A device for adding and subtracting binary numbers comprising a plurality of groups of cores with two cores in each group, said cores having substantially linear B—H curves, input means for each group of cores, each input means having two outputs respectively representing binary "0" and binary "1" and including means for applying a change of magnetizing force to one core of its associated group when producing the binary "0" output and for applying a change of magnetizing force to the other core of its associated group when the input means is producing a binary "1" output, means connected to each input means for causing the latter to produce one or the other of its two outputs, sum output means comprising a plurality of series circuits each of which series circuits has coils located on selected cores so that at least one series circuit has potentials induced in all of its coils when a sum output signal is appropriate, said sum output means also including means for combining the outputs of its series circuits and for giving an indication only when all of the coils in at least one of the series circuits have potentials concurrently induced therein, carry output means including a plurality of series circuits each of which series circuits has coils located on selected cores so that at least one series circuit has potentials induced in all of its coils when a carry output signal is appropriate, said carry output means also including means for combining the outputs of its series circuits and for giving an output only when at least one of the series circuits have potentials concurrently induced in all of the coils thereof, and borrow output means including a plurality of series circuits each of which has coils located on selected cores and arranged so that all of the coils of one of its series circuits will have potentials concurrently induced therein when a borrow output signal is appropriate, the borrow output means also including means for combining the outputs of its series circuits and giving a borrow output only when all of the coils of at least one of its series circuits have potentials concurrently induced therein.

5. A device for adding binary numbers comprising a plurality of groups of cores with two cores in each group, said cores having substantially linear B—H curves, input means for each group of cores, each input means having two states respectively representing binary "0" and binary "1" and including means for applying a change of magnetizing force to one core of its associated group when in the first state and for applying a change of magnetizing force to the other core of its associated group when it is in the second state, means connected to each input means for placing the latter in one of the other of its two states, sum output means comprising a plurality of series circuits each of which series circuits has coils located on selected cores so that at least one series circuit has potentials induced in all of its coils when a sum output signal is appropriate, said sum output means also including means for combining the outputs of its series circuits and for giving an indication only when all of the coils in at least one of the series circuits have potentials concurrently induced therein, and carry output means including a plurality of series circuits each of which series circuits has coils located on selected cores so that at least one series circuit has potentials induced in all of its coils when a carry output signal is appropriate, said carry output means also including means for combining the outputs of its series circuits and for giving an output only when at least one of the series circuits have potentials concurrently induced in all of the coils thereof.

6. A device as defined in claim 5 in which said plurality of groups of cores comprises three groups of cores, whereby there are three of said input means for respectively receiving a carry input and two numbers to be added.

7. A device for subtractig binary numbers comprising a plurality of groups of cores with two cores in each group, said cores having substantially linear B—H curves, input means for each group of cores, each input means having two states respectively representing binary "0" and binary "1" and including means for applying a change of magnetizing force to one core of its associated group when in the first state and for applying a change of magnetizing force to the other core of its associated group when it is in the second state, means connected to each input means for placing the latter in one or the other of its two states, sum output means comprising a plurality of series circuits each of which series circuits has coils located on selected cores so that at least one series circuit has potentials induced in all of its coils when a sum output signal is appropriate, said sum output means also including means for combining the outputs of its series circuits and for giving an indication only when all of the coils in at least one of the series circuits have potentials concurrently induced therein, and borrow output means including a plurality of series circuits each of which series circuits has coils located on selected cores and arranged so that all of the coils of one of its series circuits will have potentials concurrently induced therein when a borrow output signal is appropriate, the borrow output means also including means for combining the outputs of its series circuits and giving a borrow output only when all of the coils of at least one of its series circuits have potentials concurrently induced therein.

8. A device as defined in claim 7 in which said plurality of groups of cores includes at least three groups of cores, whereby there are three of said input means for respectively receiving a borrow input, a subtrahend input, and a minuend input.

9. A device for adding and subtracting binary numbers comprising a plurality of groups of cores with two cores in each group, said cores having substantially linear B—H curves, input means for each group of cores, each input means having two states respectively representing binary "0" and binary "1" and including means for applying a change of magnetizing force to one core of its associated group when in the first state and for applying a change of magnetizing force to the other core of its associated group when it is in the second state, means connected to each input means for placing the latter in one or the other of its two states, sum output means inductively coupled with said cores and arranged so that potentials will be induced in the same when the fluxes of said cores change and arranged to combine the potentials induced therein and produce a sum output signal from the combined potentials when appropriate, carry output means inductively coupled with said cores and arranged so that potentials will be induced in the same when the fluxes of said cores change and arranged to combine the potentials induced therein and produce a carry output signal from the combined potentials when appropriate, borrow output means inductively coupled with said cores and arranged so that potentials will be induced in the same when the fluxes of said core change and arranged to combine the potentials induced therein and produce a borrow output signal from the combined potentials when appropriate.

10. A device for adding binary numbers comprising a plurality of groups of cores with two cores in each group, said cores having substantially linear B—H curves, input means for each group of cores, each input means having two outputs respectively representing binary "0" and binary "1" and including means for applying a change of magnetizing force to one core of its associated group when producing the first output and for applying a change of magnetizing force to the other core of its associated group when producing the second output, means connected to each input means for placing the latter in one or the other of its two states, sum output means inductively coupled with said cores and arranged so that the potentials will be induced in same when the fluxes of said cores change and arranged to combine the potentials induced therein and produce a sum output signal from the combined potentials when appropriate, and carry output means inductively coupled with said cores and arranged so that potentials will be induced in the same when the fluxes of said cores change and arranged to combine the potentials induced therein and produce a carry output signal from the combined potentials when appropriate.

11. A device for subtracting binary numbers comprising a plurality of groups of cores with two cores in each group, said cores having substantially linear B—H curves, input means for each group of cores, each input means having two outputs respectively representing binary "0" and binary "1" and including means for applying a change of magnetizing force to one core of its associated group when producing the first output and for applying a change of magnetizing force to the other core of its associated group when producing the second output, means connected to each input means for placing the latter in one or the other of its two states, sum output means inductively coupled with said cores and arranged so that potentials will be induced in the same when the fluxes of said cores change and arranged to combine the potentials induced therein and produce a sum output signal from the combined potentials when appropriate, borrow output means inductively coupled with said cores and arranged so that potentials will be induced in the same when the fluxes of said cores change and arranged to combine the potentials induced therein and produce a borrow output signal from the combined potentials when appropriate.

12. A device for adding binary numbers comprising a plurality of groups of cores with two cores in each group, said cores having substantially linear B—H curves, input means for each group of cores, each input means having two outputs representing binary "0" and binary "1" and including means for applying a change of magnetizing force to one core of its associated group when producing the first output and for applying a change of magnetizing force to the other core of its associated group when producing the second output, means connected to each input means for placing the latter in one or the other of its two states, sum output means inductively coupled with said cores and arranged so that potentials will be induced in the same when the fluxes of said cores change and arranged to combine the potentials induced therein and produce a sum output signal from the combined potentials when appropriate, and carry output means inductively coupled with said cores and arranged so that potentials will be induced in the same when the fluxes of said cores change and arranged to combine the potentials induced therein and produce a carry output signal from the combined potentials when appropriate, said carry means including a part of said sum output means.

References Cited in the file of this patent

UNITED STATES PATENTS

| | | |
|---|---|---|
| 2,709,798 | Steagall | May 31, 1955 |

OTHER REFERENCES

Report R–211, "A Magnetic Matrix Switch and its Incorporation into a Coincident-Current Memory" by Kenneth H. Olsen, published by Digital Computer Laboratory, Massachusetts Institute of Technology, Cambridge 39, Massachusetts, June 6, 1952.